(12) United States Patent
Callari et al.

(10) Patent No.: US 12,175,003 B1
(45) Date of Patent: Dec. 24, 2024

(54) METHOD AND SYSTEM FOR MONITORING WEBSITE INTERACTION WITHOUT USE OF THIRD PARTY COOKIES

(71) Applicant: Optimera, LLC, Brooklyn, NY (US)

(72) Inventors: Michael F. Callari, Red Bank, NJ (US); Keith Candiotti, Brooklyn, NY (US); Carrie Molay, New York, NY (US)

(73) Assignee: Optimera, LLC, Brooklyn, NY (US)

( * ) Notice: Subject to any disclaimer, the term of this patent is extended or adjusted under 35 U.S.C. 154(b) by 376 days.

(21) Appl. No.: 17/643,097

(22) Filed: Dec. 7, 2021

Related U.S. Application Data

(60) Provisional application No. 63/122,101, filed on Dec. 7, 2020.

(51) Int. Cl.
| | |
|---|---|
| *G06F 21/62* | (2013.01) |
| *G06F 16/28* | (2019.01) |
| *G06F 16/9535* | (2019.01) |
| *H04L 67/146* | (2022.01) |
| *H04L 67/50* | (2022.01) |

(52) U.S. Cl.
CPC ........ *G06F 21/6263* (2013.01); *G06F 16/285* (2019.01); *G06F 16/9535* (2019.01); *H04L 67/146* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 6,594,691 B1 | 7/2003 | McCollum et al. | |
| 8,131,861 B2 | 3/2012 | Butler et al. | |
| 8,583,775 B2 | 11/2013 | Lu et al. | |
| 9,094,322 B2 | 7/2015 | Brown | |
| 9,875,485 B2 | 1/2018 | Torrance et al. | |
| 10,108,982 B2 | 10/2018 | Patton et al. | |
| 10,387,923 B2 | 8/2019 | Wang et al. | |
| 10,616,782 B2 | 4/2020 | Manolarakis et al. | |
| 10,764,350 B2 | 9/2020 | Benguerah | |
| 2012/0124206 A1* | 5/2012 | Butler | G06Q 30/02 709/224 |
| 2014/0351405 A1* | 11/2014 | Brown | H04L 45/14 709/223 |
| 2021/0352152 A1 | 11/2021 | Wang et al. | |

* cited by examiner

*Primary Examiner* — William J. Goodchild
(74) *Attorney, Agent, or Firm* — Fox Rothschild LLP

(57) ABSTRACT

This patent document describes a method and system which enables website operators to classify the behaviors of website visitors using a measurement script, without the use of third party cookies. The method includes providing multiple user-behavior-classification rule sets, each rule set including user actions for a corresponding behavior class, and including the rule sets in a measurement script. The script is configured to cause each user electronic device on which it is installed to, in response to detecting device interaction that correspond with at least one predefined user action of a behavior class, store, in a first party cookie, identifiers corresponding to the behavior classes. The method further includes making the script available to multiple web servers, each of which serves a unique website including one or more pages that provide access to the script, wherein the network server is not provided access to the first party cookies.

15 Claims, 7 Drawing Sheets

METHOD AND SYSTEM FOR MONITORING WEBSITE INTERACTION WITHOUT USE OF THIRD PARTY COOKIES

RELATED APPLICATIONS AND CLAIM OF PRIORITY

This patent document claims priority to U.S. Provisional Patent Application No. 63/122,101, filed Dec. 7, 2020, the disclosure of which is fully incorporated into this document by reference.

BACKGROUND

This patent document describes a method and system that enables a remote server to automatically identify and measure interactions of users with multiple websites in a way that preserves security and does not require servers that are remote from each website's web server to directly receive user interaction data.

Historically, website operators have used have files known as cookies to identify electronic devices of users who interact with the website. The cookie contains text or other data that a system can use to correlate the previous user actions with a device on which the cookie is detected. A motivation for using cookies is that websites can earn revenue by selling advertising space on their webpages to ad networks so that site visitors could see and potentially interact with those ads.

The problem that ad networks needed to solve early on was how to capitalize on their scale. The solution: advertising networks started to use a cookie (a unique file on a user's device that tracked the user as s/he navigated the internet) to track the type of content with which internet users interacted. This created an advantage for ad networks because they could promise an advertiser to find any user anywhere on the internet. For example, if a user went to the "how to buy a car" article on a website, an ad network could "cookie" that user as a "car buying intender." After that, every new webpage or website that this user visited, regardless of content type, that happened to also work with the ad network could provide advertising inventory that the ad network could sell to the auto manufacturer. In other words, the ad network had larger scale than any one publisher could offer.

A cookie of the type described above is generally referred to as a "third party" cookie. With third party cookies, the cookie is placed on the website visitor's device not by the website publisher directly, but instead by one of the website's partners, such as an ad network. There are also "first party" cookies that a website publisher may place a webpage visitor's device for numerous reasons. Generally, when a user having an installed first party cookie logs into the website publisher's banking website, may not need to log back in with each click because the website publisher set a first party cookie with data identifying the website visitor as "logged in" until their session times out or the user logs out.

The third party cookie created privacy concerns for internet users. Unlike first party cookies, with third party cookies it is not clear to the user what data was being collected, who was collecting it, and how it was being stored and used. Therefore, the use of a third party cookie has finally started to fall out of favor in the industry. By the year 2022, it is projected that most modern web browser applications will no longer allow third party cookies. The impact will be that ad networks will no longer be able to tell internet users apart. This will adversely affect website publishers as well because most publishers now rely on ad networks for a significant, if not all, of their business.

Thus, a problem exists in that networks that are remote from website operators need to understand the interactions of individual electronic devices and their users with the websites, without relying on third party cookies.

This patent document describes a method and system that uses this via a method and system that uses the first party cookie as a way to track users from a first party data perspective, to create scale with a standardized audience definition system, and to pass this data into systems that the publisher can use.

SUMMARY

This patent document describes a method and system which enables website operators to:
  (1) Use a standardized methodology for capturing the behavior(s) of a website visitor to a website by way of a measurement script.
  (2) Use these behavior(s) to place the website visitor into one or more behavior groups.
  (3) Rely on the client (website visitor) machine to act as the database to store the behaviors via a first party cookie.
  (4) Fetch previously stored behaviors from the website visitor's machine via the first party cookie, in a timely manner, on their next visit to the website.
  (5) Pass the behavior data into third party systems.

In various embodiments, a network server may monitor user behavior across multiple websites by providing a plurality of user behavior classification rule sets, wherein each of the user behavior classification rule sets comprises a set of user actions for a corresponding behavior class. The server will include each of the user behavior classification rule sets in a measurement script. The measurement script comprises a code set that is configured to cause each of a plurality of user electronic devices on which the measurement script is installed to: (a) query a web page that the user electronic device is accessing to return information about the user device's interaction with the web page; and (b) store, in a first party cookie on the user electronic device, one or more identifiers corresponding to the returned information. The network server will make the measurement script available to a plurality of web servers, each of which serves a unique website to one or more of the user electronic devices, and wherein each unique website includes one or more pages that provide access to the measurement script. However, the network server will not receive access to any of the first party cookies.

Optionally, the network server may receive, from each of the web servers, measurement statistics for one or more of the behavior classes over a period of time. The measurement statistics comprise aggregate data for a plurality of the user devices that access one or more of the web server's web pages. The network server will store the measurement statistics and associated web server IDs for each of the measurement statistics in a data store. The network server may receive a request from third party content provider to deliver content to a targeted audience class. The network server will access the data store and extract, from the data store, a web server ID having associated measurement statistics that correspond to the targeted audience class. The network server will designate the website of the web server that is associated with the extracted web server ID as a website via which the content is to be delivered to the targeted audience class.

Optionally, the measurement script may be configured to cause each of the user electronic devices on which the measurement script is installed to query the web page that the user electronic device is accessing and store the one or more identifiers in the first party cookie by: (a) parsing a uniform reference locator of the web page to determine one or more attributes of the web page; and (b) storing an identifier for the one or more attributes, along with a timestamp corresponding to a time of the query, in the first party cookie. As another option, the measurement script may be configured to cause each of the user electronic devices on which the measurement script is installed to query the web page that the user electronic device is accessing and store the one or more identifiers in the first party cookie by: (a) parsing the web page to identify an editorial tag for the web page, wherein the editorial tag is associated with an editorial classification; and (b) storing an identifier for the editorial classification in the first party cookie. As another option, the measurement script may be configured to cause each of the user electronic devices on which the measurement script is installed to query the web page that the user electronic device is accessing and store the one or more identifiers in the first party cookie by: (a) parsing the web page to identify a plurality of interactive page elements on the web page; (b) monitoring actions of the user electronic device to identify any of the interactive page elements with which a user of the user electronic device interacts; and (c) storing an identifier for the interactive page elements with which the user interacts in the first party cookie. As another option, the measurement script may be configured to cause each of the user electronic devices on which the measurement script is installed to query the web page that the user electronic device is accessing and store the one or more identifiers in the first party cookie by: (a) parsing the web page to identify a plurality of words or phrases in the web page; (b) for each of the plurality of words or phrases, determining a number of times that the word or phrase appears in the web page; (c) identifying any semantically related words or phrases that appear in the web page at least a threshold number of times; and (d) storing an identifier for the identified semantically related words or phrases in the first party cookie. As another option, the measurement script may be configured to cause each of the user electronic devices on which the measurement script is installed to store the one or more identifiers in the first party cookie by: (a) checking the user electronic device to determine whether the first party cookie is already installed on the user electronic device; (b) if the first party cookie is not already installed on the user electronic device, creating the first party cookie to include the one or more identifiers; and (c) if the first party cookie is already installed on the user electronic device, updating the first party cookie to include the one or more identifiers.

Optionally, a first web server of the plurality of web servers may output a user interface field that displays the user behavior classification rule set. Then, when the first web server receives, via the user interface, a modification for the user behavior classification rule set, the first web server may use the modification to generate a modified user behavior classification rule set, and it may save the modified user behavior classification rule set to the network server.

Optionally, the network server may receive the modified user behavior classification rule set from the first web server, and it may save the modified user behavior classification rule set in association with an identifier for the first web server and the behavior class for the modified user behavior classification rule set.

Optionally, making the measurement script available to the plurality of web servers may include transmitting the measurement script to the plurality of web servers and/or hosting the measurement script on the network server and transmitting, to each of the web servers, a weblink to the measurement script as hosted on the network server.

In other embodiments, to assess website visitor behavior a user electronic device will use a web application to access a page of a website that is served by a web server. While accessing the page, the device will execute, from a cache that is associated with the web application, a measurement script that causes the user electronic device to: (i) detect interactions of the user electronic device with the page; (ii) identify any of the interactions that correspond to a known behavior having a known behavior ID; and (iii) for any interaction that corresponds to a known behavior having a known behavior ID, store the known behavior ID in a first party cookie along with a time stamp corresponding to a time of the interaction.

Optionally, to detect the interactions of the user electronic device with the page, the system may parse a uniform reference locator of the page to determine one or more attributes of the page. If so, the system also may store an identifier for the one or more attributes in the first party cookie.

Optionally, to detect the interactions of the user electronic device with the page, the system may parse the page to identify an editorial tag for the page, wherein the editorial tag is associated with an editorial classification. If so, the system may store an identifier for the editorial classification in the first party cookie.

Optionally, to detect the interactions of the user electronic device with the page, the system may parse the page to identify a plurality of interactive page elements on the page, at least one of which is associated with one or more of the known behaviors. The system also may monitor actions of the user electronic device to identify any of the interactive page elements that are associated with one or more of the known behaviors with which a user of the user electronic device interacts. Then, when storing the known behavior ID in the first party cookie, the system may store an identifier for the interactive page elements with which the user interacts in the first party cookie.

Optionally, to detect the interactions of the user electronic device with the page, the system may parse the page to identify a plurality of words or phrases in the web page. For each of the words or phrases, the system may determine a number of times that the word or phrase appears in the page. The system may then identify any semantically related words or phrases that appear in the page at least a threshold number of times. Then, when storing the known behavior ID in the first party cookie, the system may store an identifier for the identified semantically related words or phrases in the first party cookie.

Optionally, before storing the known behavior ID in a first party cookie, the system may check the user electronic device to determine whether the first party cookie is already installed on the user electronic device. If the first party cookie is not already installed on the user electronic device, the system will create the first party cookie to include the known behavior ID. If the first party cookie is already installed on the user electronic device, the system will update the first party cookie to include the known behavior ID.

Optionally, before executing the measurement script, the system may determine that the page includes the measurement script, and it may determine whether the cache includes a measurement script that matches that of the page. If the cache does not include a measurement script that matches that of the web page, the system may download the measurement script from the web page to the cache.

Optionally, when storing the known behavior ID, the system also may store an incremental counter that indicates a number of times that the known behavior was detected over a time period.

In other embodiments, a method of assessing website visitor behavior includes, by a user electronic device, accessing a website served from a web server. The website will include a home page and a plurality of non-home pages. Each of the pages of the website will include a head-level element that includes a head script and a block-level element that includes an identifier for a measurement script. The device will execute the head script to determine whether the user electronic device stores a first party cookie for the website. If the first party cookie is available, the system will retrieve the first party cookie; otherwise the device will generate the first party cookie for the website. Then, for any page within the website that the user electronic device accesses, the system will execute the measurement script to detect an interaction of the user with the page that the user accesses, and it will determine whether the interaction corresponds to a known behavior having a known behavior ID. If the interaction corresponds to a known behavior having a known behavior ID, the system will add the known behavior ID to the cookie. If the action does not correspond to a known behavior having a known behavior ID, the system will identify a new behavior ID and add the new behavior ID to the cookie.

DETAILED DESCRIPTION

Figure 1:
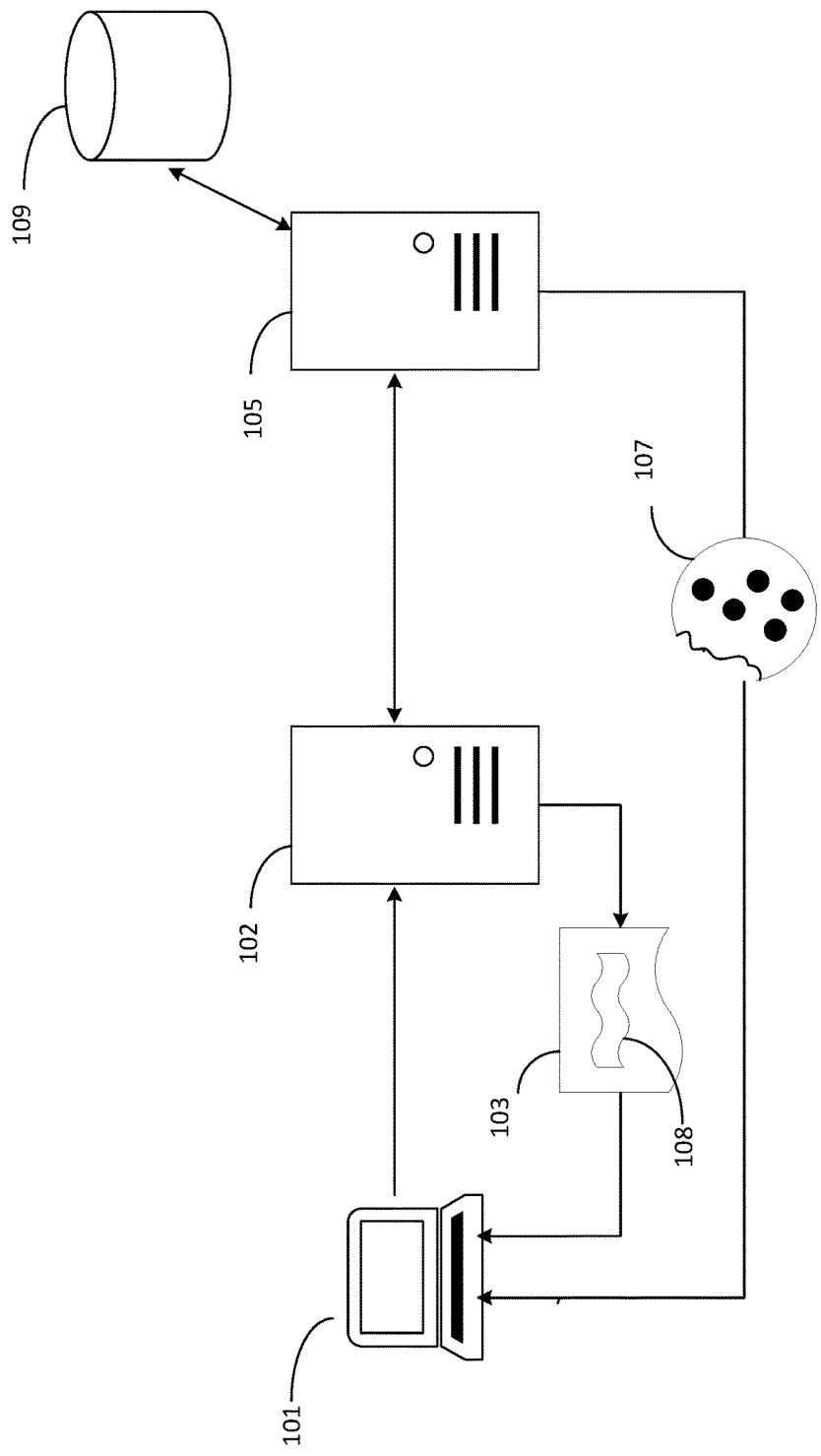
FIG. 1 illustrates a process by which a first party cookie is created upon an electronic device's first interaction with a website (i.e., a web page or web app), along with methods of using the cookie to detect user behaviors.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another and is not intended to require a sequential order unless specifically stated. The term "approximately," when used in connection with a numeric value, is intended to include values that are close to, but not exactly, the number.

Additional terms that are relevant to this disclosure will be defined at the end of this Detailed Description section.

This document describes the operation of websites, and also web services that publish content to websites. However, the methods and systems described below are not limited to traditional websites that are sets of related web pages published under a common domain name and accessible by a web browser, but also to web-based applications in which an electronic device uses a thin client other than a browser to provide the electronic device with access to content or services that are published by a remote application server. When this document uses the term "website", it is intended to cover both browser-based website access and other application-based content access via one or more web apps.

Behavior Collection and Storage

In order to group website visitors, a behavior of the visitor must be defined and captured. Currently, website publishers can define and capture their own site visitors' behaviors or, alternatively, rely on a "data management platform" as a third party, to do this for them. These two methods come with their own unique problems.

For website publishers that create their own behavior data, the data is only valuable to the website publishers themselves. In other words, a third party (such as an advertising network or other third party content provider) can't use website A's site visitor behavior data to direct online advertisements or other digital content to an internet user on website B. Therefore, there is a scale issue for digital advertisers and other content providers as they cannot understand relationships between two different website audiences. An example is: website A captures the behavior of website visitors who read news content. Website A arbitrarily classifies this behavior "news readers". Website B, however, does the exact same thing but classifies the behavior as "audience #1". If one were to imagine all of the possible different names that publishers could use to classify any single behavior, then it can be seen how it will not be scaleable for a content provider to keep track of what each website names different audiences classes. In other words, if a content provider wanted to direct digital content to every internet user who is classified as a news reader, they content provider would need to ask each website publisher to target their version of what a news reader is.

When third party cookies are used, the advertiser, ad network or other content provider could classify news content readers themselves and store this information in a third party cookie. With third party cookies, the news reader class is defined by the advertiser, advertising network or other content provider. However, when a website publisher defines the audience classification using a first party cookie, this could lead to a situation where a website publisher does not classify behaviors in the same way as the content provider, which will put the wrong users in the wrong audience class. For example, in order to add more audience members to the "news readers" audience class, the content provider may want to identify readers of purely "news" and not sports or entertainment, but the website publisher could include website visitors who read only sports content in the news audience. The content provider would never know this happened because there is no transparency into "how" a website publisher is creating their audiences.

For website publishers that use a data management platform, they are allowing a third party to create the behavioral groups and name them, on their behalf. These have the same issues as the first option in that the scale is limited and naming is not standardized. Additionally, data management platforms inherently rely on third party cookies which will no longer be supported in the future.

The methods and systems described in this document address these two issues.

First, the system creates a ubiquitous behavior categorization process. Referring back to the example of website A and website B above, the system will categorize website visitors who exhibit the "news reader" behavior on both A and B as, for example, "id_001". In this way, no matter the user or the website, as long as the behavior is "consuming news content," the website visitor will be considered part of the "id_001" audience. (In this document, the class labels such as "id_001" are used for illustrative purposes, but in practice the class label can be any unique combination of characters and/or symbols.) This adds transparency and trust into how the audience members are being placed into their respective audiences.

Second, the storage of the unique identifier is placed on the website visitor's machine as a first party cookie. This solves the issue of the third party cookie being no longer supported as the system does not rely on it in order to function.

Behavior Retrieval and Availability

This section is an illustration of how the system may interact with the website. The methods for retrieving data from cookies are well established and common knowledge to a person of skill in the art. However, for completeness, the process and purpose are described here.

Upon a website visitor using an electronic device to access a website that s/he previously visited, when using this system, code embedded in the website will check the device for the existence of the first party behavior cookie. If the cookie does not exist, a new cookie will be created as a placeholder. If the cookie does exist, then it will be checked for contents. If the cookie contains data, then that data will be fetched from the cookie and made available for use by the rest of the page code. This could mean that the publisher's advertising platform will ingest the data for targeting purposes or that the data could be passed into a website publisher's business intelligence platform for further analysis. It can also be true that this data goes unused during the page view. It will be up to the publisher to create value or purpose against the data that the system stores in the first party cookie.

Specification Creation of Behaviors

Many methods exist to classify website visitors based on actions that they take when visiting the website. However, a website publisher is often limited in the scale of any particular audience classification. Therefore, it might be hard to attract content providers to buy ad inventory or other space on the website. For example, an automotive focused website might have very few audience members reading about a very specific car model. Assume that only 100 people have read about this model on this website. An audience of 100 people may not be enough to attract the auto manufacturer's interest in placing content on this website. However, extremely large websites or internet entities such as search engines or social media companies might have millions of people looking for this particular model, and therefore have an easier time third party content providers.

A way to help even the playing field for website publishers is to create audiences that look exactly alike from one website to another. Smaller websites could pool this inventory and provide an audience level having a scale that meets a minimum threshold to attract a third party content provider. The problem is that very few website publishers work together, and systems that enable small website publishers to share audience information while maintaining privacy of individual audience members are limited.

The system presented here looks to solve this problem by standardizing the collection of behaviors and their resultant audience creation. This system will create an ecosystem in which many different and unrelated publishers can all identify the exact same behavior and audiences. Combined, publishers utilizing this system will create enough scale to compete with much larger organizations like search engines, social media companies, and ad networks.

A too that this system uses to create the standardization is a measurement script. The measurement script is a file (or set of files) containing code that represents a library of behavior collection methods. The measurement script may be served from a single resource (a web server or a group of servers) and available for download by anyone who visits a website in which the measurement script is implemented. Any time the measurement script is updated, it will be available to all participating website publishers in the system.

As mentioned, the measurement script will include a collection of methods to identify behaviors and store this information on the website visitor's device via a first party cookie. An example of behaviors is listed below. However, this list is illustrative of what can be collected but not limited to what can be collected. Any technically feasible behavior should be considered applicable to the process whether now or in a future state.

Possible Site Visitor Behaviors:
  (a) Which pages a site visitor visits. For example, the "homepage" or the "sports" section or an image "gallery".
  (b) Page elements with which the site visitor interacts. For example, clicking on a "log in" button, scrolling to a specific part of a webpage, or hovering the mouse cursor over a webpage menu item.
  (c) Providing the website with information about themselves. For example, if a pop-up message shows up on a website page asking the user to answer a question. This could be an attribute of the user such as age, gender, or income; an interest such as favorite color or favorite sports team, etc. The system may use attributes and interests to classify users.
  (d) Frequency of website visits or other website usage measurements. This could be, for example, a measurement of how many times this user visits the website per X amount of time; a measurement of how long the website visitor engages with the site during a visit; a count of how many pageviews the visitor initiates during a visit, or other website usage measurements.
  (e) A measurement of revenue that a website earned from a particular user in a period of time. The system may determine this by identifying ads that the user saw or interacted with during that time, and then summing the value of those ads during that time.

In order to collect the behavior data, the measurement script will include modules of code within its library that, upon a website visitor arriving at a site with the measurement script implemented, will look for or track activities such as the web page's URL structure, the web page's editorial tagging, and/or specific words or phrases within the website's or web page's content.

To identify a web page's URL structure, the system will query the web browser for the current host and path being viewed. The system may then parse this information to identify the website visited, the content visited, and how many different pages the user viewed.

For example, assume that the measurement script includes an audience creation rule that is "which pages were visited" and more specifically a rule to determine whether the URL of the pageview indicates that the page visited is the website's homepage, and to add the visitor to a "homepage visitor" audience class which will have the unique identification of "ID_1". In this example, when a website visitor accesses: (a) a URL that is the top-level URL of the domain (e.g., www.example.com); (b) a URL that has "index" immediately after a slash that follows the top-level URL (e.g., www.example.com/index.html); or (c) a URL that has "home" immediately after a slash that follows the top-level URL (e.g., www.example.com/home.php), the measurement script may cause the website server to create a first party cookie and store the cookie on the visitor's device. The system also may store some default measurement parameters for the cookie, such as that it was created for the user's first page view, and the time stamp of the visit. The system may store this information in the cookie, or in a separate data store in data set that is associated with a unique ID of the cookie. The measurement script will then query the browser for the current URL. The measurement script will compare the words and phrases in the URL to the audience creation rules. For example, if when executing the measurement script the system sees the phrase www.example.com/homepage, the system will understand that this is the trigger to place this user in the "homepage visitor" audience class. Therefore, the measurement script will add to the first party cookie (or to the data store) the class label "ID_1".

To identify a webpage's editorial tagging, during implementation by the website publisher of the measurement script, data can be passed to the measurement script for consideration. One possible data point can be what semantic label or "tag" the website publishers' editorial team applied to the content on the page. For example, the tag can be a handful of words that describe the content, a set of topics discussed in the content, people or places named in the content, or other attributes of the content. For example, an article about "How to buy a new car" might include the tags "auto", "automobile", "car", "car buying", "car financing" and "dealerships".

Similar tags could apply to web pages with content for particular sports, such as "football". For example, if website a visitor accesses www.example.com/sports/football_highlights, which the editorial team tagged with the phrases "football", "sports", and "highlights". Applying the example measurement script audience creation rule of "which pages were visited" and more specifically a rule to determine whether the tag of the pageview visited contains the phrase "football," the system may assign a visitor to the "football enthusiast" audience class with the unique label of "ID_2" if the user visits a website that is tagged with a word associated with that class. When the user visits the page, the measurement script will cause the publisher to create a first party cookie with this information, store it in on the visitor's device, and include or sage some parameters such whether this is the user's first page view and the time stamp of the visit.

To identify specific words within a webpage's content, the measurement script may take some or all of the words on a given webpage and place them into an array, bag of words or other semantic structure for traversing and comparison purposes. One possible use case could be if a piece of content mentions a word more than a certain number times assume the content is about or closely related to that word and place the website visitor in the "interested in x content" audience. For example, a measurement script with the audience creation rule of "which pages were visited" may more specifically have a rule stating that if the content of the pageview visited contains the word "dog" at least five times, then the visitor should be added to the "interested in dogs" audience class which will have the unique identification of "ID_3". Then, if a visitor accesses www.example.com/petcare/howtogroomyourdog, and the page contains the word "dog" 27 times, then when the user visits the page, the measurement script will create a first party cookie on the visitor's device, and include or save default parameters such as this is the user's first page view and the timestamp of the visit. The measurement script will then take some or all words on the page (or in a particular field of the page, such as an article field) and place it into an array. The measurement script will compare the word array and number of times each word exists to the audience creation rules. Here, by executing the measurement script, the system will see the word "dog" appearing 27 times and understand that this is the trigger to place this user in the "interested in dogs" audience class. Therefore, the measurement script will cause the system to add the label "ID_3" to the first party cookie.

To identify specific words within a webpage's code, the measurement script may cause the system to take some or all of the individual code elements (tags, scripts, snippets, etc.) that render on a given webpage and place them into an array for traversing and comparison purposes. For example, if the user is interacting with a specific module of the page and the module's code includes the label "x", the system may associate the website visitor with the "interested in x module" audience class. For example, if measurement script has an audience creation rule to identify "page elements with which the site visitor interacts", and more specifically to identify whether a module on the page visited contains a site "login" button. In such a situation, when the system detects a possible interaction on the page of clicking a "login" button, the user will be added to the "user who logs in" audience class, which will have the unique identification of "ID_4". When the user visits the page, the measurement script will create a first party cookie on the visitor's device and set some default parameters such as this is the user's first page view and the timestamp of the visit. The measurement script may cause the system to take some or all code modules on the page and arrange them into an array. The measurement script will cause the system count the occurrence of modules or listen for interactions with modules that adhere to the audience creation rules. For example, the measurement script may cause the system to detect when the user clicks the "login" button and understand that this is the trigger to place this user in the "user that logs in" audience class. Therefore, the measurement script will add "ID_4" to the first party cookie.

The measurement script can additionally cause the system to look for other user behaviors for audience classification purposes. The data for these additional use cases can be derived from the browser's API, prompts shown to the user such as pop-ups or forms, data previously collected in the first party cookie, or data provided by the web site publisher to the measurement script. Examples of such actions include:

(a) Detecting that a user has filled out a form and using that information to classify the user into specific audiences such as age, sex, income, email service used, brand preferences, path to purchase data, or any other volunteered information.

(b) Detecting the user's device type, browser, internet connection, IP address, geolocation information, or any other data that can generally be queried from a web browser, and placing them into audience groups accordingly.

(c) Detecting the user's visit frequency, whether the user is first time visitor to the webpage, a number of visits to the webpage, the duration of a visits, or any other data that can be created from having a known time and place of the visit based on the data contained within the first party cookie for audience grouping.

(d) Measuring revenue generated by the user visiting the site by looking at available page level data for advertising position bids and then assigning the user to an audience class based on economic value of the user.

(e) Detecting where the site visitor arrived from by way of querying the browser for the user's referral site. For example, if the user came to the site from search, a bookmark, a link on another site, etc., the system may assign the user to a class that is associated with the referral location.

Notably, when executing the measurement script the system may detect multiple user actions, attributes or preferences. If so, then the system may assign the user to multiple classes each of which corresponds to one or more detected actions or attributes. Each class will be recorded in, or in association with, the first party cookie that is stored on the user's device.

In order to illustrate the system in practice, an example of implementation and use is outlined below, with reference to FIG. 1. In the system of FIG. 1, a website publisher desires to segment its audience based on a variety of different behaviors. (This document may generally use the term "behavior" to refer to a user's detected action, attribute or interest.) Therefore, the website publisher implements the system and operates a web server 102 via which the publisher makes the website 103 available to user electronic devices such as user device 101 using now or hereafter known website publishing protocols. The website publisher or an independent third party also may operate a network server 105 (sometimes referred to in this document as a "system server") via which the system implements the audience behavior classification processes described in this document. The The website publisher will include a measurement script 108 in the code of all the pages of the website 103 for which audience behavior monitoring is desired, so that every user and webpage visit causes initialization of the measurement script 108. The measurement script 108 will check the user device 101 for the existence of a first party cookie, and it will cause the system server 105 to create a first party cookie 107 and deliver to cookie to the user device 101 if one is not present. If a first party cookie is already present on the user device 101, the measurement script will add data to the first party cookie as measured by the measurement script, retrieve contents from the cookie as required, and make any resultant data ready for ingestion by other unrelated services as the website publisher sees fit (for example, an advertising platform).

After the technical implementation is done, the website publisher will have the ability to choose from prebuilt measurements or to request custom measurements. Prebuilt measurement scripts may be stored in a data store 109 of user behavior classification rule sets, in which each rule set includes rules for detecting user actions that correspond to a behavior class. For example, us assume that the measurement script has a prebuilt measurement script for the behavior: "homepage visitors" and the website publisher wants to create an audience class segment for "homepage visitors." Also assume that the website publisher wishes to create a custom behavior to track website visitors that click any link on the homepage. In order to accomplish the above, the measurement script must have a process by which to identify when a behavior occurs and a unique audience identification string assigned to the behavior. All behaviors that are added to the measurement script will be globally available to any participant in the system. In other words, the measurement script will look exactly the same from website to website. Therefore, as a website publisher requests new custom behavior capturing, all website publishers will benefit from that new categorization and have the ability to capture the same behavior on their website as well if they so choose due to all having access to the exact same measurement script.

Since the website publisher in this case wishes to use the "homepage visitors" prebuilt behavior, let us assume that is a measurement built into the original iteration of the system. The mechanism for detection of the behavior in the measurement script 108 may be, for example, to query the browser API running on the electronic device 101, and if the current webpage visit is visiting a page in which the URL structure ends in a domain (such as .com or .gov) then assume that the visit is occurring on the homepage. Therefore, within the first party cookie 107, assign the "homepage visit" unique identifier as an exhibited behavior.

Next, the system may account for the tracking of link clicking on the page for the second audience group. Since the website publisher is asking for a new behavior that is non-existent in the measurement script behavior, the functionality may be added to the measurement script logic, or created as a new measurement script. This flexibility allows the measurement script to organically evolve as website publisher demands change over time without needing to replace the system with an entirely new system. But rather, additional modules can be added in at any time. In this case, the website publisher wishes to measure any user that clicks a link on the homepage. Let us assume that at this point the system only had the "homepage visitors" behavior which has the unique identification of "ID_1". Therefore, the measurement script's new logic may be something such as:

Query the browser API and if the current webpage visit is visiting a page in which the URL structure ends in a domain (such as .com or .gov) then assume that the visit is occurring on the homepage. If true, then if the website visitor clicks a link at any point to browse away from the homepage, assign within the first party cookie the "homepage link interaction" behavior identifier "ID_2."

The measurement script can be updated over time with additional behaviors that will continue to add new behavior definitions. Updates may be stored in the data store of user classification rule sets 109.

Once the behavior categorization process is complete and the system is deployed to a website publisher's live/production site, when the first website visitor uses a browser or other app of a user device 101 to access the website 103 the following may occur:

(1) The measurement script 108 will check to see if this user has a first party cookie 107 created by the system. In this case, there will not be one present and the system will create an empty first party cookie.
(2) The measurement script 108 will detect that this webpage visitor is on the homepage of the website 103.
(3) The measurement script 108 will write to the webpage visitor's first party cookie 107 an array containing the proper value, in this example case "{ID_1}" because that is the ID of a webpage visitor exhibiting the homepage visit behavior.

At this point, once the webpage visitor ends the session (such as by closing the browser window), no further system action needs to be taken. Rather than having saved any of the interaction data in a database or a third party cookie as is the current state of the art, the website visitor's user electronic device 101 has become the database by way of the first party cookie 107. An added benefit to this method is that the user has ownership of their data and thus significantly increased privacy control. Should the user want to delete their cookies, this would destroy any data being tracked on that user. Additionally, this protects the publisher from having to store and manage, or arrange for a third party service to store and manage user data.

Figure 2:
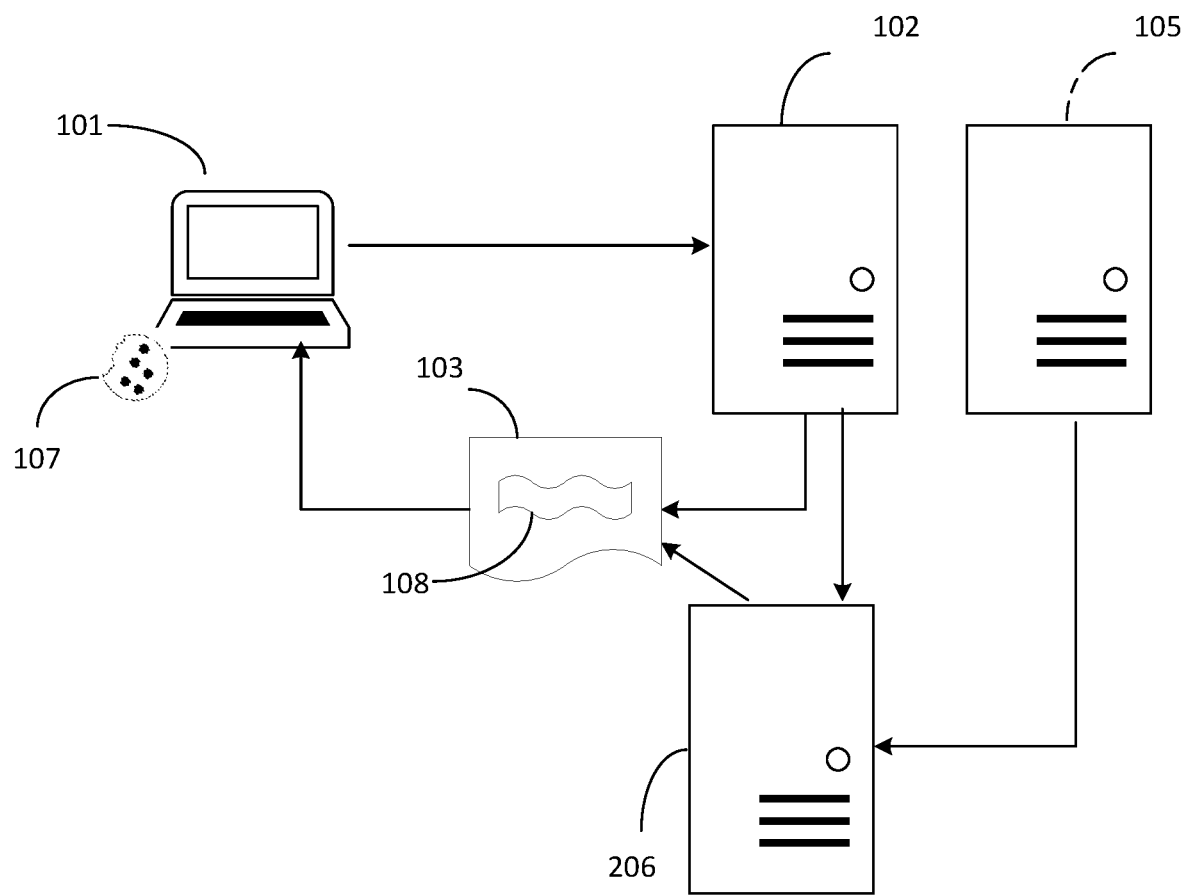
FIG. 2 illustrates a process of retrieving and updating first party cookie data when a user's electronic device returns to the website.

At some point in the future, the same individual on the same device using the same browser navigates back to the homepage of the same website. With reference to the flow diagrams of FIG. 2, the system of FIG. 1 now includes a third party content provider server 206, such as an ad server, that provides digital content to be included in web pages that are displayed on the user's device. With this embodiment, the following will occur when user electronic device 101 is used to access a web page 103:

(1) The measurement script will check to see if this user electronic device 101 has a first party cookie 107 created by the system. In this case there is one present in a memory of the user electronic device 101.
(2) The system will parse the data array from the cookie 107 and make that data available to the rest of the webpage's code. In this case, the audience value is "ID_1" and it is a globally available array.
(3) Presume that the publisher wishes to target advertisements to homepage visitors. Therefore, the value "ID_1" may be passed by the publisher (e.g., website server 102) into the publisher's advertising platform (e.g., content provider server 206) to aid in the ad selection process. (This step may or may not be done and is not requisite for the system to operate.)
(4) The measurement script 108 will detect that this webpage visitor is on the homepage of the website 103.
(5) The measurement script 108 will re-write to the webpage visitor's first party cookie 107 an array containing the proper value, in this case "{ID_1}"
(6) Assume now that the webpage visitor clicks a link on the homepage of the website 103 to visit an article page on the website.
(7) The measurement script 108 will append to the array in the cookie 107 that the webpage visitor has exhibited the "homepage link interaction" behavior. In this case: "{ID_1}+ID_2={ID_1, ID_2}.".
(8) When the user device accesses the article page of the website 103, the system will run again, this time retrieving from the cookie 107 ID_1 and ID_2 and making them available to the publisher's web page code for potential investment into their ad platform, etc. The network server may receive the behavior IDs, but not the cookie, from the system.

Figure 3:
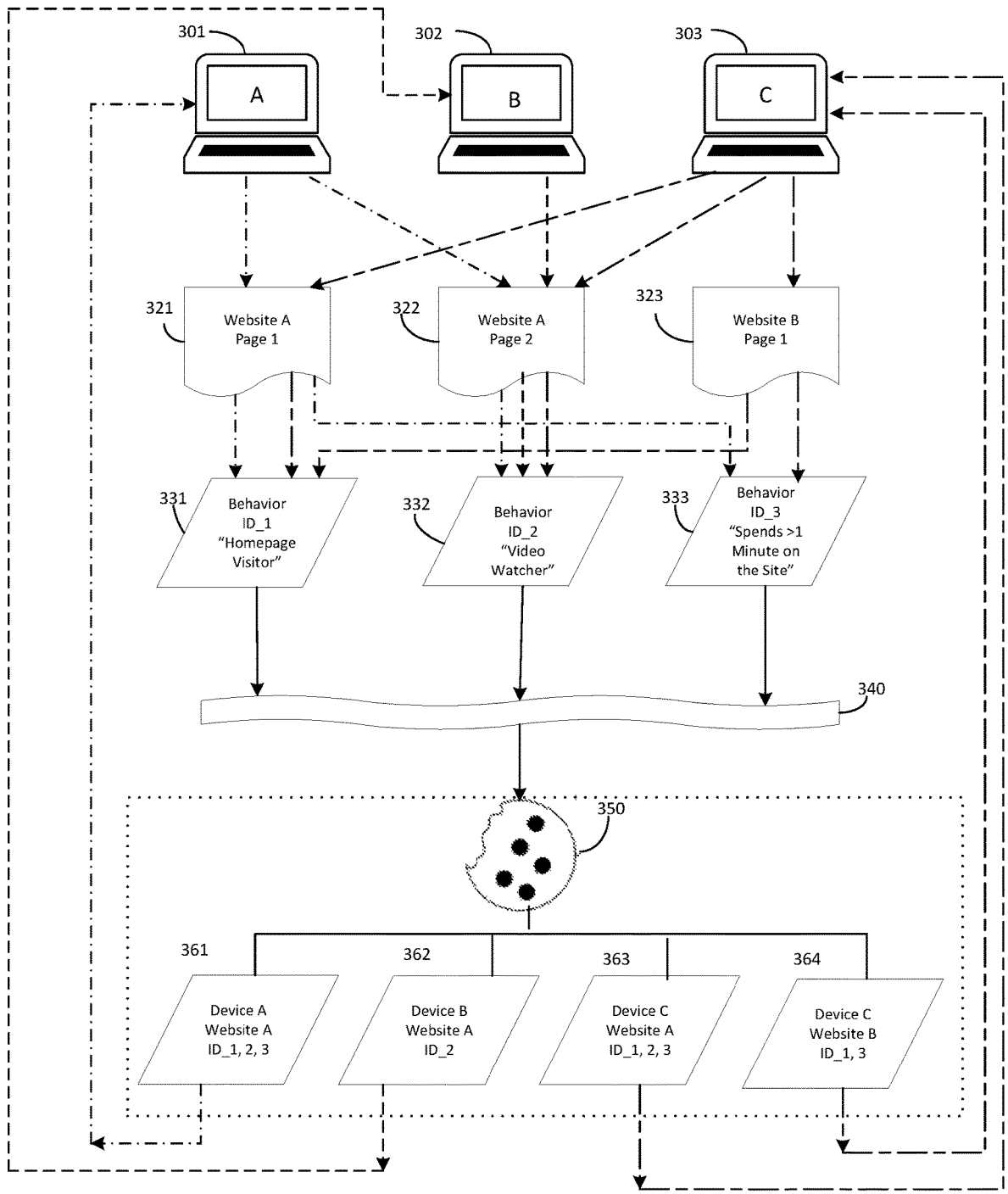
FIG. 3 is a flow diagram illustrating how the solution measurement script, hosted on a network server and accessed by multiple web servers, may provide a layer of audience interaction measurement standardization across multiple websites.

FIG. 3 is a flow diagram illustrating how the solution measurement script, hosted on a network server and accessed by multiple web servers, may provide a layer of audience interaction measurement standardization across multiple websites. In FIG. 3, user device A 301, user device B 302, and user device C 303 access various pages of various websites. In particular:

User device A 301 accesses Website A page 1 321 and Website A page 2 322. Because Website A page 1 321 is the home page of Website A, user device A 301 exhibits the behavior of a homepage visitor (Behavior ID_1 331). While on Website A page 1 321, user device A 301 also spends more than 1 minute on the site (Behavior ID_3 333). While on Website A page 2 322, user device A accesses a video, and therefore user device A 301 exhibits the behavior of a video watcher (Behavior ID_2 332).

User device B 302 also accesses Website A page 2 322 and exhibits the behavior of a video watcher (Behavior ID_2 332).

User device C 303 also accesses Website A page 1 321 and therefore exhibits the behavior of a homepage visitor (Behavior ID_1 331). User device C 303 also accesses Website A page 2 322 and watches a video and therefore exhibits the behavior of a video watcher (Behavior ID_2 332). User device C 303 also accesses Website B page 1 323 and again exhibits the behavior of a homepage visitor (Behavior ID_1 331). While on Website B page 1 323, user device C 303 also spends more than 1 minute on the site (Behavior ID_3 333).

Each of Websites A and B will include a measurement script 340 that monitors user behavior while each device is accessing the respective site. (FIG. 3 illustrates a single measurement script 340, but in practice the measurement scripts for each website may include some common features and some varying features.)

The measurement script 340 of each website generates or updates a first party cookie 350 that records the detected behaviors for each user device. (FIG. 3 illustrates a single first party cookie 350, but in practice the measurement scripts will generate separate cookies for each device.) In the illustrated example, the behavioral data 361 that the measurement script 340 detected for Device A while accessing Website A 321 will be saved to a first party cookie 350 on device A 301. The behavioral data 362 that the measurement script 340 detected for Device B while accessing Website B 322 will be saved to a first party cookie 350 on device B 302. The behavioral data 363 that the measurement script 340 detected for Device C while accessing Website A 321 will be saved to a first party cookie 350 on Device C 303. The behavioral data 364 that the measurement script 340 detected for Device C while accessing Website B 322 also will be saved to a first party cookie 350 on Device C 303.

Figure 4:
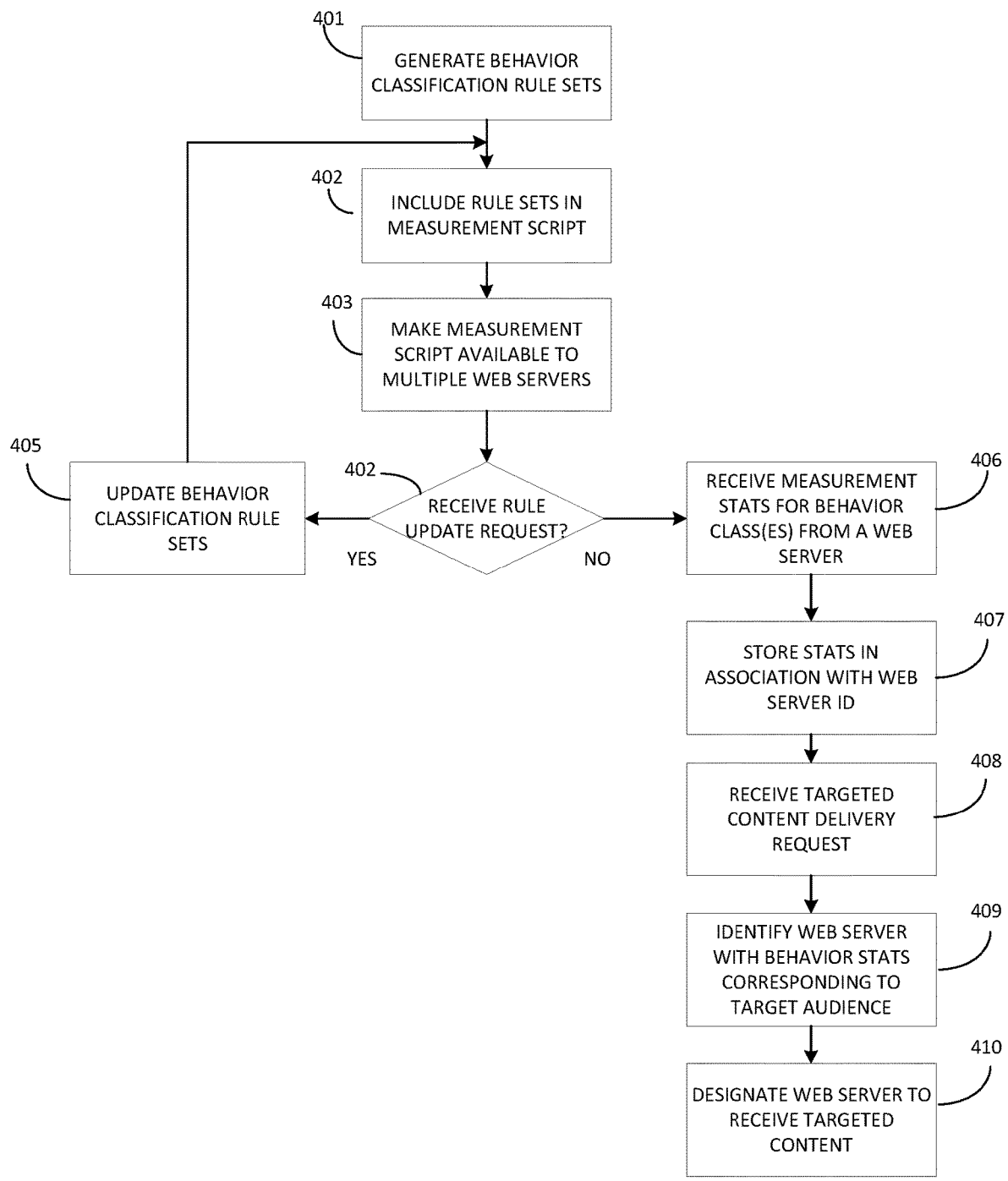
FIG. 4 is a flow diagram illustrating how the measurement script may operate, from the viewpoint of a network server that hosts the measurement script.

FIG. 4 is a flow diagram illustrating how the measurement script may operate, from the viewpoint of a network server that hosts the measurement script. To monitor user behavior across multiple websites, at 401 a network server will generate (by retrieving, receiving, or creating) several user behavior classification rule sets. Each of the user behavior classification rule sets comprises a set of user actions that correspond to a behavior class. At 402 the server will include each of the user behavior classification rule sets in a measurement script, which as described above is a code set that is configured to cause each user electronic device on which the measurement script is installed to: (a) query a web page that the user electronic device is accessing to return information about the user device's interaction with the web page, and (B) store, in a first party cookie on the user device, one or more identifiers corresponding to the returned information.

At 403 the network server will make the measurement script available to various web servers, each of which serves a unique website to one or more of the user electronic devices. Making the measurement script available to the web servers my be done by (a) transmitting the measurement script to the plurality of web servers, or (b) hosting the measurement script on the network server and transmitting, to each of the web servers, a weblink to the measurement script as hosted on the network server. Either way, each unique website will include one or more pages (i.e., web pages or web app functions) that provide access to the measurement script. The network server will not be provided access to any of the first party cookies.

At 406 the network server will receive, from each of the web servers, measurement statistics for one or more of the behavior classes over a period of time. The measurement statistics comprise aggregate data for multiple user devices that access one or more of the web server's web pages. At 407 the network server will store the measurement statistics and associated web server IDs for each of the measurement statistics in a data store.

At 408 the network server may receive a request from third party content provider to deliver content to a targeted audience class. At 409 the web server will access the data store and extracting, from the data store, a web server ID having associated measurement statistics that correspond to the targeted audience class. At 410 the web server will designate the website of the web server that is associated with the extracted web server ID as a website via which the content is to be delivered to the targeted audience class.

The measurement script may be configured to cause each of the user electronic devices on which the measurement script is installed to query the web page that the user electronic device is accessing and store the one or more identifiers in the first party cookie in one of several possible ways. For example:

In one option, the user electronic device may: (a) parse a uniform reference locator of the web page to determine one or more attributes of the web page; and (b) store an identifier for the one or more attributes, along with a timestamp corresponding to a time of the query, in the first party cookie.

In another option, the measurement script may cause the user electronic to: (a) parse the web page to identify an editorial tag for the web page, wherein the editorial tag is associated with an editorial classification; and (b) store an identifier for the editorial classification in the first party cookie.

In another option, the measurement script may cause the user electronic device to: (a) parse the web page to identify a plurality of interactive page elements on the web page; (b) monitor actions of the user electronic device to identify any of the interactive page elements with which a user of the user electronic device interacts; and (c) store an identifier for the interactive page elements with which the user interacts in the first party cookie.

In another option, the measurement script may cause the user electronic device to: (a) parse the web page to identify a plurality of words or phrases in the web page; (b) for each of the plurality of words or phrases, determine a number of times that the word or phrase appears in the web page; (c) identify any semantically related words or phrases that appear in the web page at least a threshold number of times; and (d) store an identifier for the identified semantically related words or phrases in the first party cookie.

In another option, the measurement script may cause the user electronic device to: (a) check the user electronic device to determine whether the first party cookie is already installed on the user electronic device; (b) if the first party cookie is not already installed on the user electronic device, create the first party cookie to include the one or more identifiers; and (c) if the first party cookie is already installed on the user electronic device, updating the first party cookie to include the one or more identifiers.

Optionally, any of the web servers may output a user interface field that displays the user behavior classification rule set. At 402 the network server may receive, via the user interface of the web server (directly or indirectly by one or more intermediate processes), a modification for the user behavior classification rule set. If so, then at 405 the network server may use the modification to generate a modified user behavior classification rule set, and at 402 it may save the modified user behavior classification rule set to the network server.

Figure 5:
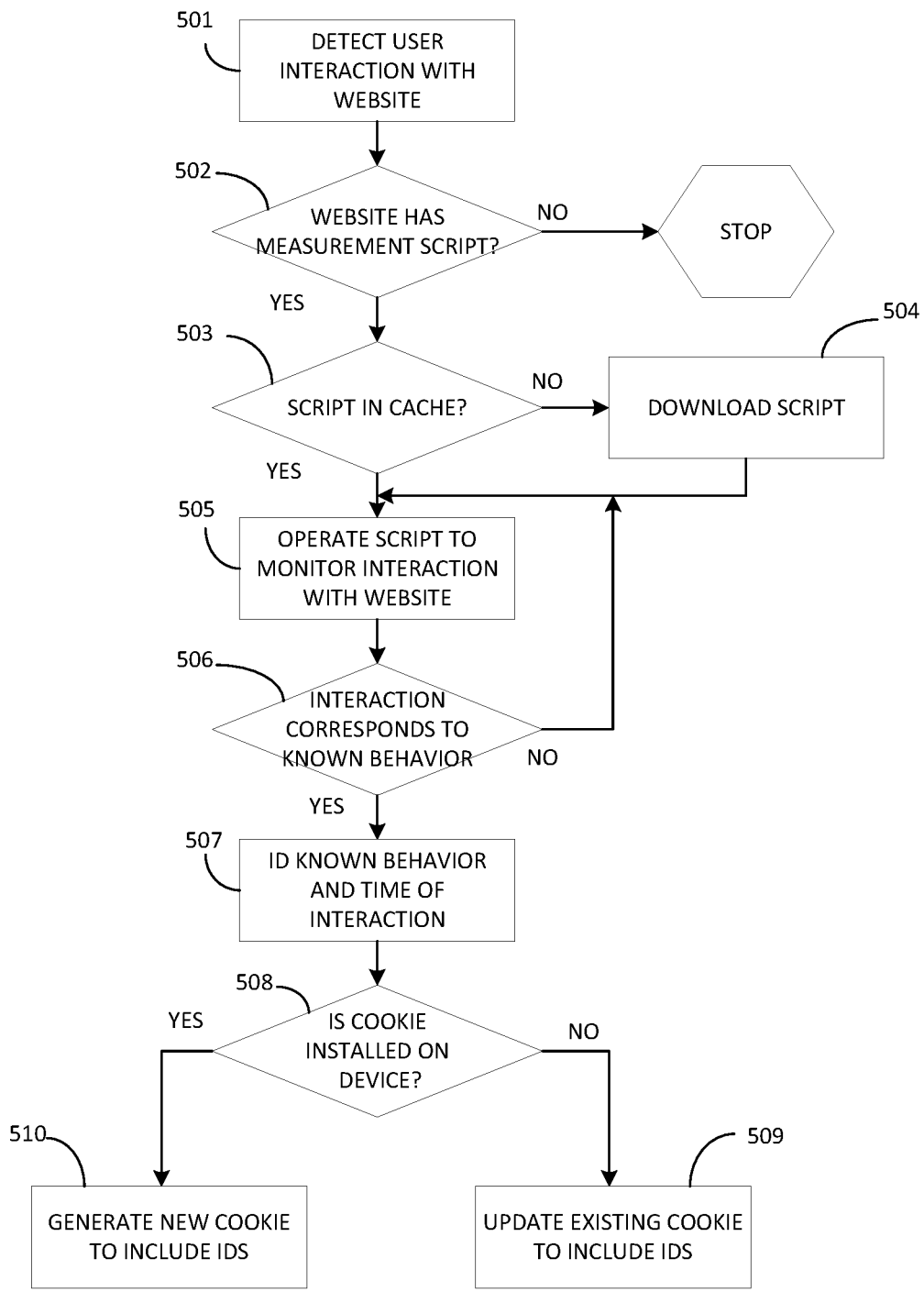
FIG. 5 is a flow diagram illustrating how the measurement script may operate, from the viewpoint of a user electronic device that interacts with one or more websites.
Figure 6:
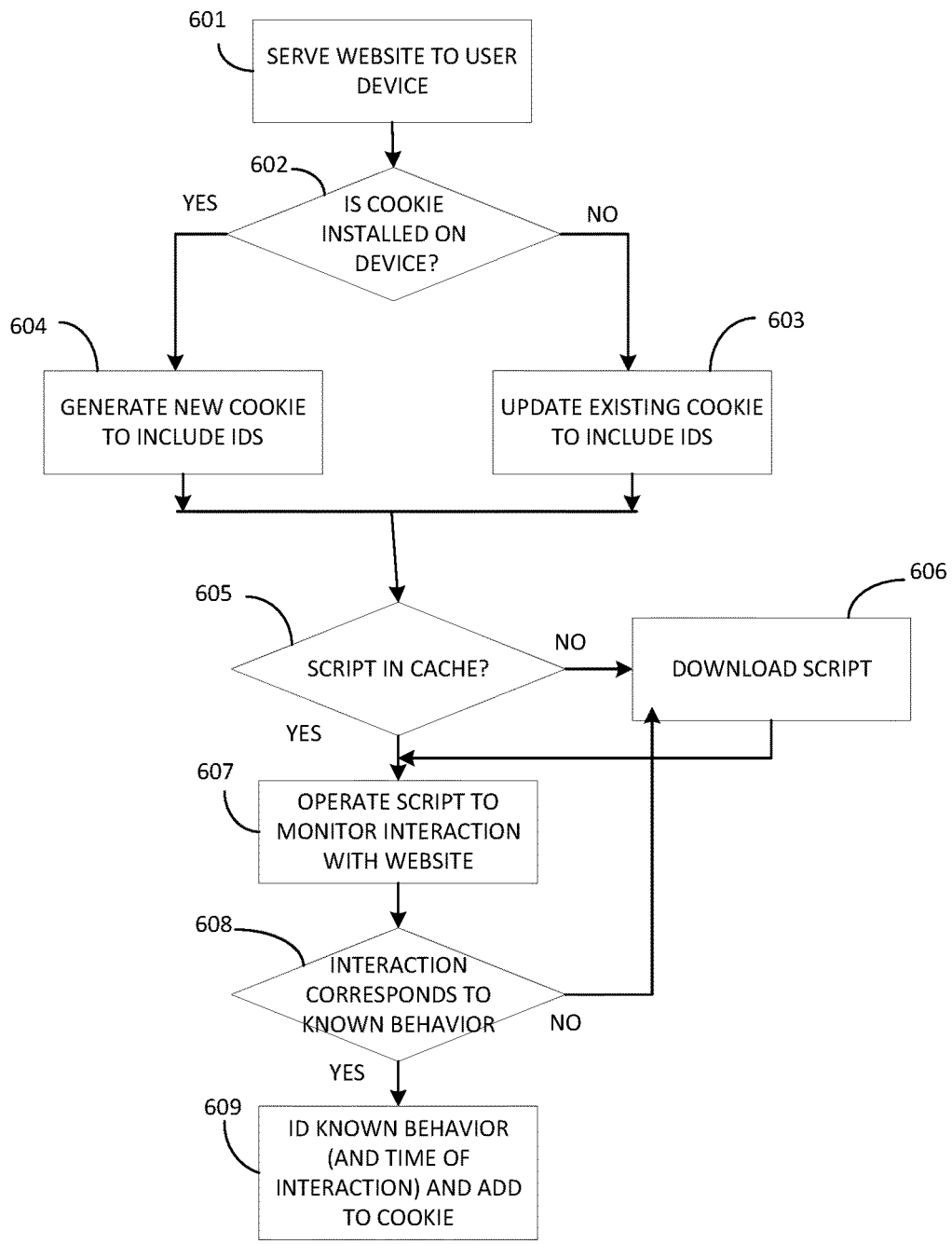
FIG. 6 is a flow diagram illustrating how the measurement script may operate, from the viewpoint of a web server in combination with a user electronic device.

FIG. 5 illustrates a method of assessing website visitor behavior from the viewpoint of a user electronic device that a user uses to access the website. At 501 the device will use a web application (i.e., a browser, a web app, or the like) to access a page of a website that is served by a web server. The device may determine whether the website uses the measurement script at 502. If not, the process will stop. However, if so, then at 503 while accessing the page, the system will determine whether a measurement script is in a device cache that is associated with the web application. If so, it will download the script from the web server at 504.

After downloading the script, or if the script is already in the device's cache, at 505 the device will execute, from the cache that is associated with the web application. Executing the measurement script will cause the device to detect interactions of the user electronic device with the page. At 506 the measurement script will cause the device to identify any of the interactions that correspond to a known behavior having a known behavior ID. For example, to detect the interactions the device may parsing a uniform reference locator of the web page to determine one or more attributes of the web page, and device may store an identifier for the one or more attributes in the first party cookie. In another option, the measurement script may cause the user electronic to: (a) parse the web page to identify an editorial tag for the web page, wherein the editorial tag is associated with an editorial classification; and (b) store an identifier for the editorial classification in the first party cookie. In another option, the measurement script may cause the user electronic device to: (a) parse the web page to identify a plurality of interactive page elements on the web page; (b) monitor actions of the user electronic device to identify any of the interactive page elements with which a user of the user electronic device interacts; and (c) store an identifier for the interactive page elements with which the user interacts in the first party cookie.

In another option, the measurement script may cause the user electronic device to: (a) parse the web page to identify a plurality of words or phrases in the web page; (b) for each of the plurality of words or phrases, determine a number of times that the word or phrase appears in the web page; (c) identify any semantically related words or phrases that appear in the web page at least a threshold number of times; and (d) store an identifier for the identified semantically related words or phrases in the first party cookie. In another option, the measurement script may cause the user electronic device to: (a) check the user electronic device to determine whether the first party cookie is already installed on the user electronic device; (b) if the first party cookie is not already installed on the user electronic device, create the first party cookie to include the one or more identifiers; and (c) if the first party cookie is already installed on the user electronic device, updating the first party cookie to include the one or more identifiers.

For any interaction that corresponds to a known behavior having a known behavior ID (507), the device will store the known behavior ID in a first party cookie along with a time stamp corresponding to a time of the interaction. The device will do this by, at 508, determining if a first party cookie for the website is already on the device. If the cookie is present, then at 509 the system will update the cookie to include the known behavior IDs. If the cookie is not present, then at 510 the system will create and store a new cookie with the known behavior IDs.

Optionally, when storing the known behavior ID the device also may store an incremental counter that indicates a number of times that the known behavior was detected over a time period.

From the viewpoint of a web server, a method of assessing website visitor behavior may include the web server serving a website to a user electronic device at 601, wherein the website comprises a home page and several non-home pages. Each of the pages the website may include a head-level element that includes a head script, and a block-level element that includes a link to measurement script. At 602, the web server may cause the user electronic device execute the head script to determine whether the user electronic device stores a first party cookie for the website. If the first party cookie is available, at 603 the system may retrieve the first party cookie, otherwise at 604 the system may generate the first party cookie for the website.

If the measurement script for the website is not in the device's cache (605), then the device may download the script at 606. After doing that, or if the script is already in the cache, then for any page within the website that the user accesses, at 607 the user device may execute the measurement script to detect an interaction of the user with the page that the user accesses. At 608 the device may determine whether the interaction corresponds to a known behavior having a known behavior ID. If the interaction corresponds to a known behavior having a known behavior ID, it may add the known behavior ID (and optionally a time of the interaction) to the cookie at 609.

Figure 7:
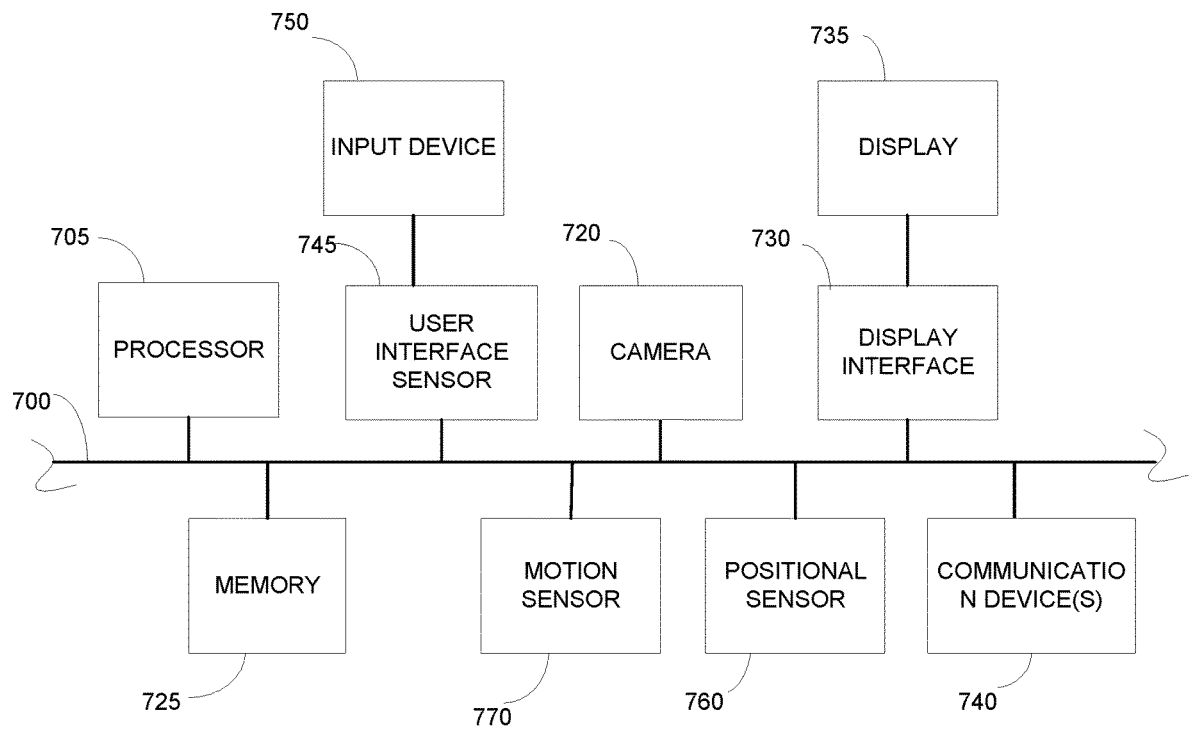
FIG. 7 illustrates example elements of an electronic device, such as a network server, a web server or a user electronic device.

FIG. 7 depicts an example of internal hardware that may be included in any of the electronic components of the system, such as the user's smartphone or a local or remote computing device in the system. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored.

An optional display interface 730 may permit information from the bus 700 to be displayed on a display device 735 in visual, graphic or alphanumeric format. An audio interface and audio output (such as a speaker) also may be provided. Communication with external devices may occur using various communication devices 740 such as a wireless antenna, an RFID tag and/or short-range or near-field communication transceiver, each of which may optionally communicatively connect with other components of the device via one or more communication system. The communication device 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from a camera 720 that can capture video and/or still images. The system also may include a positional sensor 780 and/or motion sensor 770 to detect position and movement of the device. Examples of motion sensors 770 include gyroscopes or accelerometers. Examples of positional sensors 780 include a global positioning system (GPS) sensor device that receives positional data from an external GPS network.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 7.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of monitoring user behavior at multiple websites, the method comprising by a network server:
   providing a plurality of user behavior classification rule sets, wherein each of the user behavior classification rule sets comprises a set of user actions for a corresponding behavior class;
   including each of the user behavior classification rule sets in a measurement script, wherein the measurement script comprises a code set that is configured to cause each of a plurality of user electronic devices on which the measurement script is installed to:
      in response to detecting device interaction with a web page detecting, based on the rule sets, at least one user action corresponding to a behavior class,
      storing, in a first party cookie on the user electronic device, an identifier of the corresponding behavior class; and
   making the measurement script available to a plurality of web servers, each of which serves a unique website to one or more of the user electronic devices, and wherein each unique website includes one or more pages that provide access to the measurement script,
   wherein the network server is not provided access to any of the first party cookies.

2. The method of claim 1, further comprising, by the network server:
   receiving, from each of the plurality of web servers, measurement statistics for one or more of the behavior classes over a period of time, wherein the measurement statistics comprise aggregate data for a plurality of the user devices that access one or more of the web server's web pages;
   storing the measurement statistics and associated web server IDs for each of the measurement statistics in a data store;
   receiving a request from a third party content provider to deliver content to a targeted audience class;
   accessing the data store and extracting, from the data store, a web server ID having associated measurement statistics that correspond to the targeted audience class; and
   designating the website of the web server that is associated with the extracted web server ID as a website via which the content is to be delivered to the targeted audience class.

3. The method of claim 1, wherein the measurement script is configured to cause each of the user electronic devices on which the measurement script is installed to query the web page that the user electronic device is accessing and store the one or more identifiers in the first party cookie by:
   parsing a uniform reference locator of the web page to determine one or more attributes of the web page; and
   storing an identifier for the one or more attributes, along with a timestamp corresponding to a time of the query, in the first party cookie.

4. The method of claim 1, wherein the measurement script is configured to cause each of the user electronic devices on which the measurement script is installed to query the web page that the user electronic device is accessing and store the one or more identifiers in the first party cookie by:
   parsing the web page to identify an editorial tag for the web page, wherein the editorial tag is associated with an editorial classification; and
   storing an identifier for the editorial classification in the first party cookie.

5. The method of claim 1, wherein the measurement script is configured to cause each of the user electronic devices on which the measurement script is installed to query the web page that the user electronic device is accessing and store the one or more identifiers in the first party cookie by:
   parsing the web page to identify a plurality of interactive page elements on the web page;
   monitoring actions of the user electronic device to identify any of the interactive page elements with which a user of the user electronic device interacts; and
   storing an identifier for the interactive page elements with which the user interacts in the first party cookie.

6. The method of claim 1, wherein the measurement script is configured to cause each of the user electronic devices on which the measurement script is installed to query the web page that the user electronic device is accessing and store the one or more identifiers in the first party cookie by:
   parsing the web page to identify a plurality of words or phrases in the web page;
   for each of the plurality of words or phrases, determining a number of times that the word or phrase appears in the web page;
   identifying any semantically related words or phrases that appear in the web page at least a threshold number of times; and
   storing an identifier for the identified semantically related words or phrases in the first party cookie.

7. The method of claim 1, wherein the measurement script is configured to cause each of the user electronic devices on which the measurement script is installed to store the one or more identifiers in the first party cookie by:
   checking the user electronic device to determine whether the first party cookie is already installed on the user electronic device;
   if the first party cookie is not already installed on the user electronic device, creating the first party cookie to include the one or more identifiers; and if the first party cookie is already installed on the user electronic device, updating the first party cookie to include the one or more identifiers.

8. The method of claim 1, further comprising, by a first web server of the plurality of web servers:
   outputting a user interface field that displays the user behavior classification rule set;
   receiving, via the user interface, a modification for the user behavior classification rule set;
   using the modification to generate a modified user behavior classification rule set; and
   saving the modified user behavior classification rule set to the network server.

9. The method of claim 8, further comprising, by the network server:
   receiving the modified user behavior classification rule set from the first web server; and
   saving the modified user behavior classification rule set in association with an identifier for the first web server and the corresponding behavior class for the modified user behavior classification rule set.

10. The method of claim 1, wherein making the measurement script available to the plurality of web servers comprises:
    transmitting the measurement script to the plurality of web servers; or
    hosting the measurement script on the network server and transmitting, to each of the web servers, a weblink to the measurement script as hosted on the network server.

11. A method of assessing website visitor behavior, the method comprising, by a user electronic device:
    using a web application to access a page of a website that is served by a web server; and
    while accessing the page, executing a measurement script that causes the user electronic device to:
       parse a uniform reference locator of the page to determine one or more attributes of the web page, and store an identifier for the one or more attributes in a first party cookie; or
       parse the page to identify an editorial tag for the page, wherein the editorial tag is associated with an editorial classification, and store an identifier for the editorial classification in the first party cookie; or
       parse the page to identify a plurality of interactive page elements on the page, at least one of which is associated with one or more of the known behaviors, and monitor actions of the user electronic device to identify any of the interactive page elements that are associated with one or more of the known behaviors with which a user of the user electronic device interacts, and store an identifier for the interactive page elements with which the user interacts in the first party cookie; or
       parse the page to identify a plurality of words or phrases in the page, for each of the plurality of words or phrases, determine a number of times that the word or phrase appears in the page, and identify any semantically related words or phrases that appear in the page at least a threshold number of times, and store an identifier for the identified semantically related words or phrases in the first party cookie.

12. The method of claim 11, further comprising, by the user electronic device before storing the known behavior ID in the first party cookie:
    checking the user electronic device to determine whether the first party cookie is already installed on the user electronic device;
    if the first party cookie is not already installed on the user electronic device, creating the first party cookie to include the known behavior ID; and
    if the first party cookie is already installed on the user electronic device, updating the first party cookie to include the known behavior ID.

13. The method of claim 11, further comprising, by the user electronic device before executing, from a cache that is associated with the web application, a measurement script:
    determining that the page includes the measurement script;
    determining whether the cache includes a measurement script that matches that of the page; and
    if the cache does not include a measurement script that matches that of the page, downloading the measurement script from the page to the cache.

14. The method of claim 11, wherein storing the known behavior ID also comprises storing an incremental counter that indicates a number of times that the known behavior was detected over a time period.

15. A method of assessing website visitor behavior, the method comprising, by a user electronic device:
    accessing a website served from a web server, wherein:
       the website comprises a home page and a plurality of non-home pages comprising a measurement script;
    executing the measurement script to:
       determine whether the user electronic device stores a first party cookie for the website, and
       if the first party cookie is available, retrieve the first party cookie, otherwise generate the first party cookie for the website;
    for any page within the website that the user electronic device accesses, executing the measurement script to:
    detect an interaction of the user with the page that the user accesses,
    determine whether the interaction corresponds to a known behavior, and
    if the interaction corresponds to a known behavior, add an indicator of the known behavior to the first party cookie,
    wherein detecting the interaction of the user with the page comprises parsing one or more of the following:
       parsing the page to identify a uniform reference locator of the page to determine one or more attributes of the web page;
       parsing the page to identify an editorial tag for the page, wherein the editorial tag is associated with an editorial classification; or
       parsing the page to identify a plurality of interactive page elements on the page, at least one of which is associated with one or more of the known behaviors.

* * * * *